US010665909B2

(12) United States Patent
Campbell et al.

(10) Patent No.: US 10,665,909 B2
(45) Date of Patent: May 26, 2020

(54) BATTERY THERMAL RUN-AWAY AND COMBUSTION PREVENTION SYSTEM

(71) Applicant: International Business Machines Corporation, Armonk, NY (US)

(72) Inventors: Eric Campbell, Rochester, MN (US); Sarah Czaplewski, Rochester, MN (US); Jennifer Porto, Rochester, MN (US); Elin F. LaBreck, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/651,511

(22) Filed: Jul. 17, 2017

(65) Prior Publication Data
US 2019/0020076 A1    Jan. 17, 2019

(51) Int. Cl.
*H01M 10/613* (2014.01)
*H01M 10/6595* (2014.01)
(Continued)

(52) U.S. Cl.
CPC ......... *H01M 10/613* (2015.04); *G01K 11/125* (2013.01); *G01K 11/165* (2013.01);
(Continued)

(58) Field of Classification Search
CPC ........... H01M 10/613; H01M 10/4257; H01M 10/486; H01M 10/0525; H01M 10/6595; H01M 2200/10; G01K 11/125; G01K 11/20; G01K 11/165; H02J 7/0031; H02J 7/0091
See application file for complete search history.

(56) References Cited

U.S. PATENT DOCUMENTS 6,136,475 A   10/2000 Tsutsumi
7,396,612 B2   7/2008 Ohata
(Continued)

FOREIGN PATENT DOCUMENTS

CN   103579697 A   2/2014
CN   204271170 U   4/2015
(Continued)

OTHER PUBLICATIONS

Wikipedia: Lithium-ion battery https://web.archive.org/web/20170705160650/https://en.wikipedia.org/wiki/Lithium-ion_battery retrieved by Archive.org on Jul. 5, 2017 (Year: 2017).*
(Continued)

*Primary Examiner* — Alexander Satanovsky
*Assistant Examiner* — Mark I Crohn
(74) *Attorney, Agent, or Firm* — Isaac J. Gooshaw

(57) ABSTRACT

A device for preventing thermal run-away in a battery. The device includes a main compartment that is divided into a plurality of sub-compartments. A layer of material separates (i) a first sub-compartment containing a first chemical from (ii) a second sub-compartment containing a second chemical. In the event that a thermal run-away event is either detected or predicted, the layer of material degrades/is degraded and allows the chemicals to mix. The chemicals form an endothermic process that cools the battery preventing, or at least delaying, the thermal run-away event.

20 Claims, 12 Drawing Sheets

(51) Int. Cl.
  *H01M 10/0525* (2010.01)
  *H01M 10/42* (2006.01)
  *H01M 10/48* (2006.01)
  *G01K 11/12* (2006.01)
  *G01K 11/20* (2006.01)
  *G01K 11/16* (2006.01)
  *H02J 7/00* (2006.01)

(52) U.S. Cl.
  CPC ......... *G01K 11/20* (2013.01); *H01M 10/0525* (2013.01); *H01M 10/4257* (2013.01); *H01M 10/486* (2013.01); *H01M 10/6595* (2015.04); *H01M 2200/10* (2013.01); *H02J 7/0031* (2013.01); *H02J 7/0091* (2013.01)

(56) References Cited

U.S. PATENT DOCUMENTS

| | | | |
|---|---|---|---|
| 8,361,649 | B2 | 1/2013 | Hermann |
| 8,733,465 | B1 | 5/2014 | Flood |
| 8,986,872 | B2 | 3/2015 | Lev |
| 9,178,217 | B2 | 11/2015 | Jung |
| 9,520,619 | B2 | 12/2016 | Bianchi |
| 2003/0003358 | A1 | 1/2003 | Mandal |
| 2009/0039835 | A1* | 2/2009 | Wolf ............... G01R 31/36 320/136 |
| 2010/0028758 | A1 | 2/2010 | Eaves |
| 2011/0262783 | A1 | 10/2011 | Mehta |
| 2011/0298626 | A1* | 12/2011 | Fechalos ............ H01M 10/482 340/664 |
| 2015/0221914 | A1 | 8/2015 | Page |
| 2017/0187411 | A1* | 6/2017 | Coulter ............... H04B 1/3888 |
| 2017/0200993 | A1 | 7/2017 | Song |
| 2017/0287664 | A1 | 10/2017 | Elsherbini et al. |
| 2018/0149402 | A1* | 5/2018 | Srivastava ............ A61H 23/00 |
| 2019/0020077 | A1 | 1/2019 | Campbell |

FOREIGN PATENT DOCUMENTS

| | | |
|---|---|---|
| JP | 2009016106 A | 1/2009 |
| JP | 2009301798 A | 12/2009 |
| WO | WO-2015179625 A1 | 11/2015 |
| WO | 2017106349 A1 | 6/2017 |

OTHER PUBLICATIONS

"Lithium-ion Battery", Wikipedia, Last edited on Jul. 4, 2017 at 07:17, 16 pages <https://web.archive.org/web/20170705160650/https://en.wikipedia.org/wiki/Lithium-ion_battery retrieved by Archive.org>.

Campbell et al., "Battery Thermal Run-Away And Combustion Prevention System", U.S. Appl. No. 15/896,387, filed Feb. 14, 2018, pp. 1-37.

IBM Appendix P, "List of IBM Patents or Patent Applications to be Treated as Related", dated Feb. 14, 2018, 2 pages.

"Hoverboard Battery Replacement Choose from UL2271, Samsung, LG, & Basic—36V MSDS, Fully Certified Lithium-Ion", Street Saw, accessed Jun. 27, 2017 3:57PM, 12 pages, <https://www.streetsaw.com/products/hoverboard-battery-replacement?variant=24231305478>.

"Lithium Battery Failures", Electropedia, accessed on Jun. 27, 2017 3:52PM, 8 pages, <http://www.mpoweruk.com/lithium_failures.htm>.

"Lithium-ion Safety Concerns", Battery University, Accessed on Jun. 27, 2017 4:03 PM, 17 pages, <http://batteryuniversity.com/learn/archive/lithium_ion_safety_concerns>.

"Prevent Thermal Runaway Propagation", All cell tech, accessed on Jun. 27, 2017 4:08 PM, 3 pages, <https://www.allcelltech.com/index.php/technology/pcc-thermal-management/prevents-thermal-runaway>.

"Thermal runaway", From Wikipedia, the free encyclopedia, last edited on Jun. 24, 2017, at 14:46, 6 pages, <https://en.wikipedia.org/wiki/Thermal_runaway>.

Liu et al., "Electrospun core-shell microfiber separator with thermal-triggered flame-retardant properties for lithium-ion batteries", Science Advances, Research Article, 2017;3, Jan. 2017, pp. 1-8, <http://advances.sciencemag.org/>.

Yim et al., "Self-Extinguishing Lithium Ion Batteries Based on Internally Embedded Fire-Extinguishing Microcapsules with Temperature-Responsiveness", NANO letters, Published: Jul. 15, 2015, © 2015 American Chemical Society, pp. 5059-5067.

* cited by examiner

BATTERY THERMAL RUN-AWAY AND COMBUSTION PREVENTION SYSTEM

BACKGROUND OF THE INVENTION

This invention relates generally to battery device mechanical design. More specifically, the invention relates to prevention of thermal run-away in batteries through the use of an endothermic reaction.

The battery industry is continually expanding to meet the increasing energy needs of the portable equipment, transportation, and communication markets. Lithium-ion is becoming the industry standard battery chemistry due to its high energy density, sealed design and high availability in world markets.

Lithium-ion batteries are produced in a number of variations; the most popular lithium-ion batteries, which have the highest energy density, use a cobalt or nickel-cobalt oxide anode. These batteries have the ability to create their own internal supply of oxygen when overheated. More specifically, oxygen is liberated from the oxide material of the anode at elevated temperatures, which can occur due to a variety of causes, such as an internal short circuit, overcharging, or other cause. Since both oxygen and fuel are internally available to the cells, a fire can start within a single battery cell, and can be difficult to extinguish with conventional methods. In some cases, the fire will continue until all the flammable materials in the battery, i.e., in all of the cells, have been exhausted.

SUMMARY

Embodiments of the present invention provide a method, system, program products, and devices for preventing thermal run-away in batteries, the device comprising:

In one embodiment, a device for preventing thermal run-away in batteries is disclosed. The device comprises a main compartment that is divided into a plurality of sub-compartments including at least a first compartment and a second compartment. The device includes a layer of material that separates (i) the first compartment, which contains a first chemical and (ii) the second compartment, which contains a second chemical, wherein the layer of material has a melting point that is at most 60 degrees Celsius (° C.). The device includes a first covering that (i) encloses the main compartment and (ii) has a melting point above 60° C.

In one embodiment, a device for preventing thermal run-away in batteries is disclosed. The device comprises an endothermic device; a power storage device; one or more computer processors; one or more computer readable storage medium; and program instructions stored on the computer readable storage medium for execution by at least one of the one or more processors. The program instructions comprise program instructions to determine a temperature of the power storage device; and program instructions to activate the endothermic device in response to a determination that the temperature of the power storage device exceeds a threshold that indicates a potential thermal run-away event for the power storage device.

DETAILED DESCRIPTION

Figure 1:
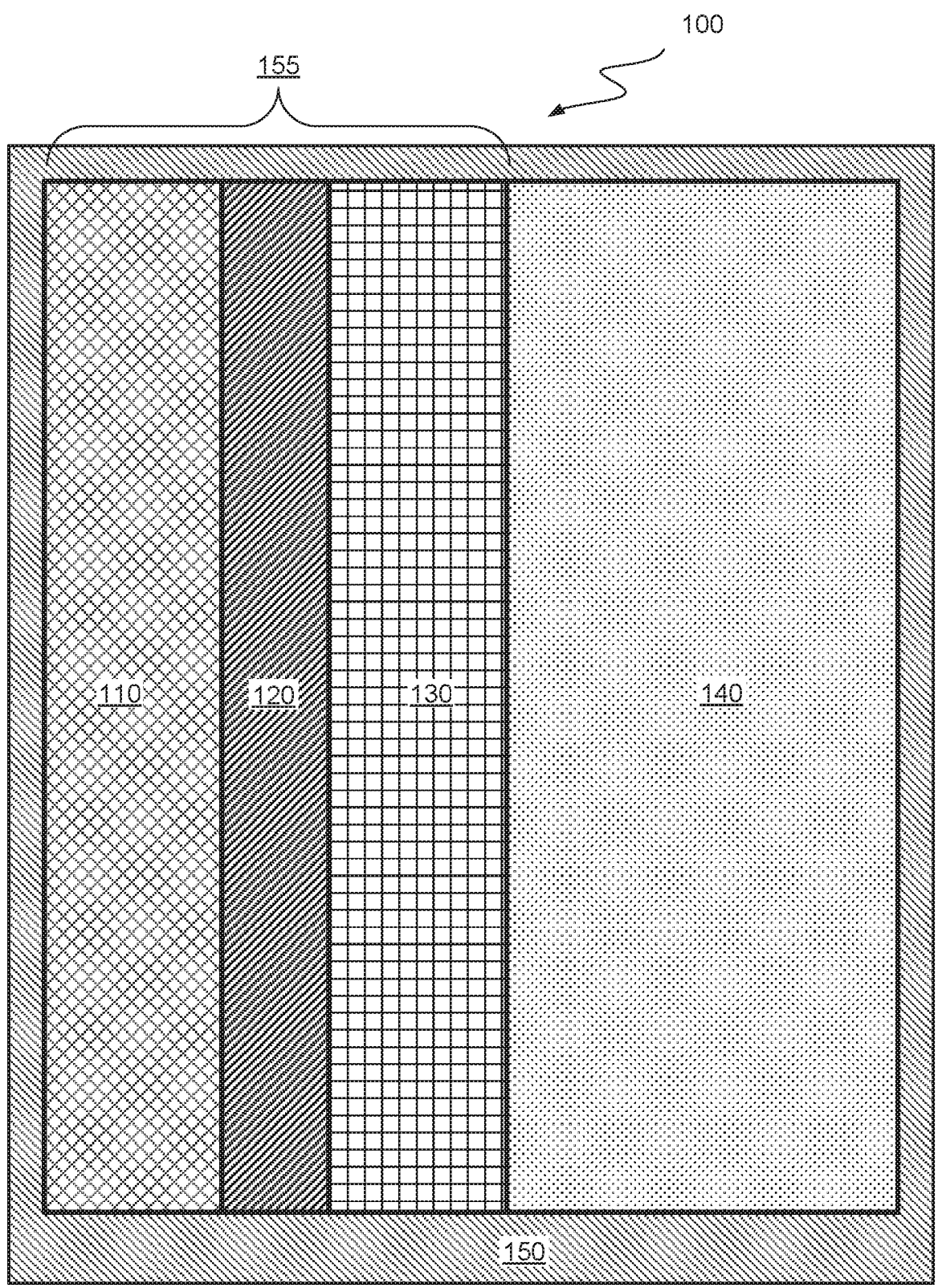
FIG. 1 is a side cut-away view illustrating a battery device with an integrated and un-activated cooling device, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In some instances, battery fires are caused by liberated oxygen combining with flammable electrolyte. In one such instance, it was determined that the fire was caused by metal shavings that were inadvertently encased in a battery cell during the manufacturing process. A shaving had pierced the battery separator, resulting in an internal short. The short heated the battery separator, causing it to melt, thus compromising the electrical insulation between the positive and negative electrodes. This further short circuit caused severe internal heating of the cell to the point where it vented hot gas and internal cell materials. However, as has been found in many fires involving lithium-ion battery devices, the event did not stop after the venting of the first cell. In some scenarios a cell with overheating is able to heat an adjoining cell to the point where the adjoining cell also began to overheat, the process can continue until all the cells in the device have completed the combustion process. This phenomenon is often referred to in the industry as "thermal run-away".

The term endothermic process describes a process or reaction in which the system absorbs energy from its surroundings; usually, but not always, in the form of heat. In general, an endothermic reaction is a chemical reaction that depends on absorbing heat if it is to proceed. As such, these chemical reactions generally consume reagents and heat in order to produce products.

A chemical reaction involves the conversion of reactant molecules to products. This conversion requires cleavage of old chemical bonds in the reagents and the formation of new chemical bonds to form the product molecule. All chemical bonds have certain strength and require some energy for dissociation. This energy is typically provided by collision between reactant molecules, by external heating, or by a catalyst. The formation of certain types of chemical bonds releases some energy. In contrast, the formation of other types of chemical bonds require the net absorption of energy, e.g., heat. The overall change in energy during a chemical reaction is known as heat of reaction. It is typically denoted by "$\Delta H$" and expressed in Kj/mol. In the case of endothermic reactions, heat is absorbed to form the chemical bonds of the product, which reduces the available heat, i.e., there is a net absorption of heat to form the product. In embodiments of the present invention, such absorption of heat cools a battery that has met criteria indicating that the battery is at risk of thermal run-away.

The present invention provides a novel method, computer program product, computer system, and device for reducing the probability of thermal run-away, and thus preventing the start of a fire in battery devices. Embodiments of the present invention recognize that preventing the existence of a fire/thermal run-away is often preferable to attempting to suppress an existing state of thermal run-away/fire in a battery/battery cell. Embodiments of the present invention recognize that certain characteristics are present before a battery begins thermal run-away/fire. Embodiments of the present invention leverage these characteristics to initiate preventative actions, thereby preventing thermal run-away/fire in a given battery/battery cell from occurring in the first place.

Embodiments of the present invention provide a device for preventing thermal run-away and fire from occurring in batteries, such as lithium-ion batteries, that are exhibiting characteristics that proceed, i.e., indicate conditions that lead to, thermal run-away and/or combustion. The device includes a battery and a first compartment that abuts the battery. The first compartment includes endothermic reagents.

In one embodiment, the first compartment includes a first sub-compartment and a second sub compartment that each contain one or more reagents that, when combined, yield an endothermic reaction. In one embodiment, the two compartments are separated by a heat/temperature sensitive membrane that degrades at a temperature that is below that of thermal run-away of the battery. When the cell or battery starts to undergo thermal run-away, the increase in temperature degrades the membrane, thereby mixing the reagents inside the compartment. The endothermic reaction cools the battery. Thermal run-away is prevented from occurring when the battery is cooled down.

Embodiments of the present invention recognize that in lithium-ion cells, thermal runaway is typically triggered from exposure to temperatures above 60 degrees Celsius (° C.), which may be caused by, but is not limited to, Joule heating (due to excessive current), excessive environmental temperatures, or some combination of the two. Embodiments of the present invention recognize that thermal run-away heats organic solvents in the electrolyte of the battery, which begin to breakdown due to the high temperatures. As the solvents convert to gaseous phase, pressure builds up inside the cell until the gases are released, via a safety vent, to prevent explosion of the cell. However, the vented gases begin to combust upon coming into contact with the outside atmosphere, i.e., the gases combust in the presence of oxygen.

Certain embodiments of the present invention provide a dual bladder/compartment system that is incorporated into a battery housing. In each bladder a separate endothermic chemical reactant is contained. Separating the two compartments is a low melting temperature (LMT) material layer that melts, decomposes, or otherwise breaks down when it reaches a desired trigger temperature/condition. When the LMT layer decomposes, the reactants mix causing an endothermic reaction to occur. The endothermic reaction draws heat away from the battery, preventing the temperature of the battery from reaching the thermal runaway threshold.

Certain embodiments of the present invention provide a temperature sensor that monitors the battery temperature. The data from that sensor is leveraged to determine whether the endothermic reaction has been triggered. If it detects it has been triggered a switch can be opened to prevent the battery from either charging or discharging.

The present invention will now be described in detail with reference to the Figures.

FIG. 1 is a side cut-away view illustrating a battery device, 100, with an integrated and un-activated cooling device, in accordance with an exemplary embodiment of the present invention. As shown in FIG. 1, battery device 100 includes a chamber that contains, i.e., is at least partly filled by, an endothermic device composed of chemical storage compartments 110 and 130, and barrier 120, which separates chemical storage compartments 110 and 130. For example, such an endothermic device fills a space designated by a bracket 155. Hereinafter, the endothermic device is denoted as cooling device 160, which includes 110, 120, and 130. In general, cooling device 160 is configured and to, and includes structures and components to, generate an endothermic reaction, in accordance with one embodiment of the present invention. An example of an endothermic reaction is the combination of ammonium nitrate and water, which produces a standard enthalpy of 25.41 kJ/mol, i.e., it absorbs thermal energy for the reaction to reach completion. In this example, there is no actual "chemical reaction". Instead the endothermic activity results from the dissolution of ammonium nitrate into an ammonium ion and nitrate ion solution, which is a solvation event, i.e., NH4NO3(s)→NH4+(aq)+NO3−(aq).

Like many ionic solids, the dissolution of ammonium nitrate into an ammonium ion and nitrate ion solution is an endothermic dissolution. To break the ionic bonds holding the lattice together requires energy, which is absorbed from the surrounding environment, making the solution cold. While some heat is generated when the ammonium and nitrate ions interact with the water molecules (an exothermic reaction), this amount of heat is far less than that required for the water molecules to break the strong ionic bonds in the solid ammonium nitrate. Therefore the overall dissolution of ammonium nitrate in water is strongly endothermic. In other words, the temperature of the solution is reduced as the ionic salt dissolves because of the changes in molecular organization for the before and after states of the salt and the solvent.

In another reaction, barium hydroxide is reacted with ammonium thiocyanate. In this reaction, $Ba(OH)_2 \cdot 8H_2O$ (s)+2 $NH_4SCN$(s)→$Ba(SCN)_2$(s)+10 $H_2O$ (l)+2 $NH_3$ (g). Note that one of the products of this reaction is ammonia gas. In some scenarios and embodiments, the evolved ammonia gas is vented into a chamber that holds a reagent (such as an acid such as nitric acid) that forms a solid when it reacts with ammonia, e.g., an ammonium salt. Examples of ammonium salts are ammonium chloride, $NH_4Cl$, ammonium nitrate, $NH_4NO_3$, and ammonium carbonate, $(NH_4)_2CO_3$. As noted above, ammonium nitrate reacts with water to yield an endothermic dissolution reaction. As such, certain embodiments recognize and leverage the products of one endothermic reaction to generate reagents for/drive a second endothermic reaction. Embodiments of the present invention, provide various compartments and connections therebetween, such as one-way valves, that provide for the transferring and storage of various reagents and chambers in which reactions occur. In some embodiments, small amounts of certain products, such as ammonia gas, are released in a controlled manner to provide an olfactory indication that a cooling device has been activated. The amount of such released products, e.g., ammonia, is carefully controlled to prevent toxic affects due to over-exposure to the product. It is believed that the odor threshold for ammonia may be low as 0.04 parts per million (ppm) and as high as 57 ppm. It is also believed that ammonia exposure to ammonia in concentrations as high as 25 ppm has negligible effects on adult humans. As such, in one embodiment, ammonia gas is released at a rate that provides a concentration between 5 ppm and 25 ppm to ensure that a large percentage of the population will be able to safely detect, via smell, the activation of cooling device 160.

In FIG. 1, battery device 100 includes a charge holding portion, 140. In general, charge holding portion 140 includes positive and negative terminals that may be, and in some embodiments are, connected to a device that draws power from charge holding portion 140. An example of such a charge holding portion may include, but is not limited to, lithium ion battery cells. In general, charge holding portion 140 can be any combination of components consisting of one or more electrochemical cells with external connections provided to power electrical devices.

In various embodiments, barrier 120 is a barrier that prevents the exposure/exchange of chemicals respectively stored in chemical storage compartments 110 and 130. In one embodiment, barrier 120 is a plastic material that melts at a temperature that is equal to or is below the thermal run-away temperature of battery device 100, i.e., melts at or below 60° C. As such, barrier 120 is designed to fail, i.e., to allow/cause an exchange of chemicals between chemical storage compartments 110 and 130, when barrier 120 reaches a specific temperature. One example material for barrier 120 is Polycaprolactone (PCL), which is a biodegradable polyester with a low melting point of around 60° C. and a glass transition temperature of about −60° C. One skilled in the art recognizes that the inclusion of various substituents in a polymer can alter the melting point of the polymer. Therefore, the examples provided herein are not to be construed as limiting. Instead, many variations and combinations of polymers and materials may be used within the scope of this invention for a barrier that fails at a specified temperature. For example, in one embodiment, barrier 120 is a mixture of materials including fully refined paraffin (melting point 58-60° C.) and oils to yield a barrier with a melting point range of 53–55° C.

Embodiments of the present invention recognize that structural integrity/strength/resilience often decreases as a material approaches its melting point. As such, in some embodiments, barrier 120 includes a mesh of materials (that have a melting point above 60° C.) that provide structural support for the low melting temperature material. In some embodiments and scenarios, such a mesh reduces the chances of premature failure (degradation) of barrier 120 as barrier 120 increases toward/approaches 60° C. As such, upon reaching the melting point of barrier 120, due to the heating of battery device 100, barrier 120 degrades and becomes permeable, thereby initiating the mixing of the chemicals respectively stored in chemical storage compartments 110 and 130. The chemicals respectively stored in chemical storage compartments 110 and 130 comprise two or more reagents that, when combined, generate/result in an endothermic reaction. As such, when barrier 120 degrades (e.g., melts) and allows the mixing of the chemicals respectively stored in chemical storage compartments 110 and 130 an endothermic reaction is created. The close proximity to, and contact between, surfaces of cooling device 160 and charge holding portion 140 results in a transfer of thermal energy from charge holding portion 140 to cooling device 160. In general, in most embodiments, the transfer of energy thermal energy from charge holding portion 140 to cooling device 160 drives, in part, the endothermic reaction that occurs in cooling device 160, since endothermic reactions typically require the absorption of thermal energy to generate products.

In the embodiment illustrated in FIG. 1, both cooling device 160 and charge holding portion 140 are encapsulated by enclosure material 150. In one embodiment, enclosure material 150 is a material that is chemically resistant to (i) the reagents in chemical storage compartments 110 and 130, (ii) the products of those reagents, and (iii) the chemical components, or derivatives thereof, of charge holding portion 140. Note that in one embodiment, the material is a plastic that is chemical resistant, as noted above, as well as being temperature resistant within a temperature range that starts below the temperature generated by the activation of cooling device 160 and ends above the temperature generated by the normal charging and discharging of charge holding portion 140.

In some embodiments, the temperature range of enclosure material 150 exceeds the temperature at which charge holding portion 140 would exhibit one or both of thermal run-away and fire, i.e., enclosure material 150 retains its structural characteristics above 60° C. In some such embodiments, enclosure material 150 is a "warning" device that includes temperature changing color compounds that change color depending on their temperature. Such color changing materials are known to one having ordinary skill in the art. For example, enclosure material 150 includes an exterior layer of thermochromic plastic that changes to a bright color upon exposure to the temperature generated by activation of cooling device 160. In another example, enclosure material 150 includes an exterior layer of thermochromic plastic (which includes microscopic capsules of thermochromic liquid crystals) that changes to a bright color upon exposure to the temperature generated by charge holding portion 140 that is heated to a temperature above a threshold. In another example, enclosure material 150 is painted with a leucodye containing paint. As such, based on temperature, enclosure material 150 provides a visual indicator that a problem has occurred with battery device 100.

In one embodiment, a chemiluminescent microcapsules are incorporated into cooling device 160, i.e., into an endothermic bladder system. Chemiluminescence is the production of light from a chemical reaction. For example, two chemicals react to form an excited (high-energy) intermediate, which breaks down releasing some of its energy as photons of light. In one embodiment, the microcapsules trigger, i.e., break down and release their chemical contents, at the same temperature as barrier 120. When the chemicals of the microcapsules combine they produce light. A light detecting sensor is incorporated into the battery to detect when the microcapsules are triggered based on detection of the chemiluminescent light. When the sensor detects light from the microcapsules it triggers a switch to turn off the device or the battery from charging, affectively stopping current flow to or from the battery.

Figure 2:
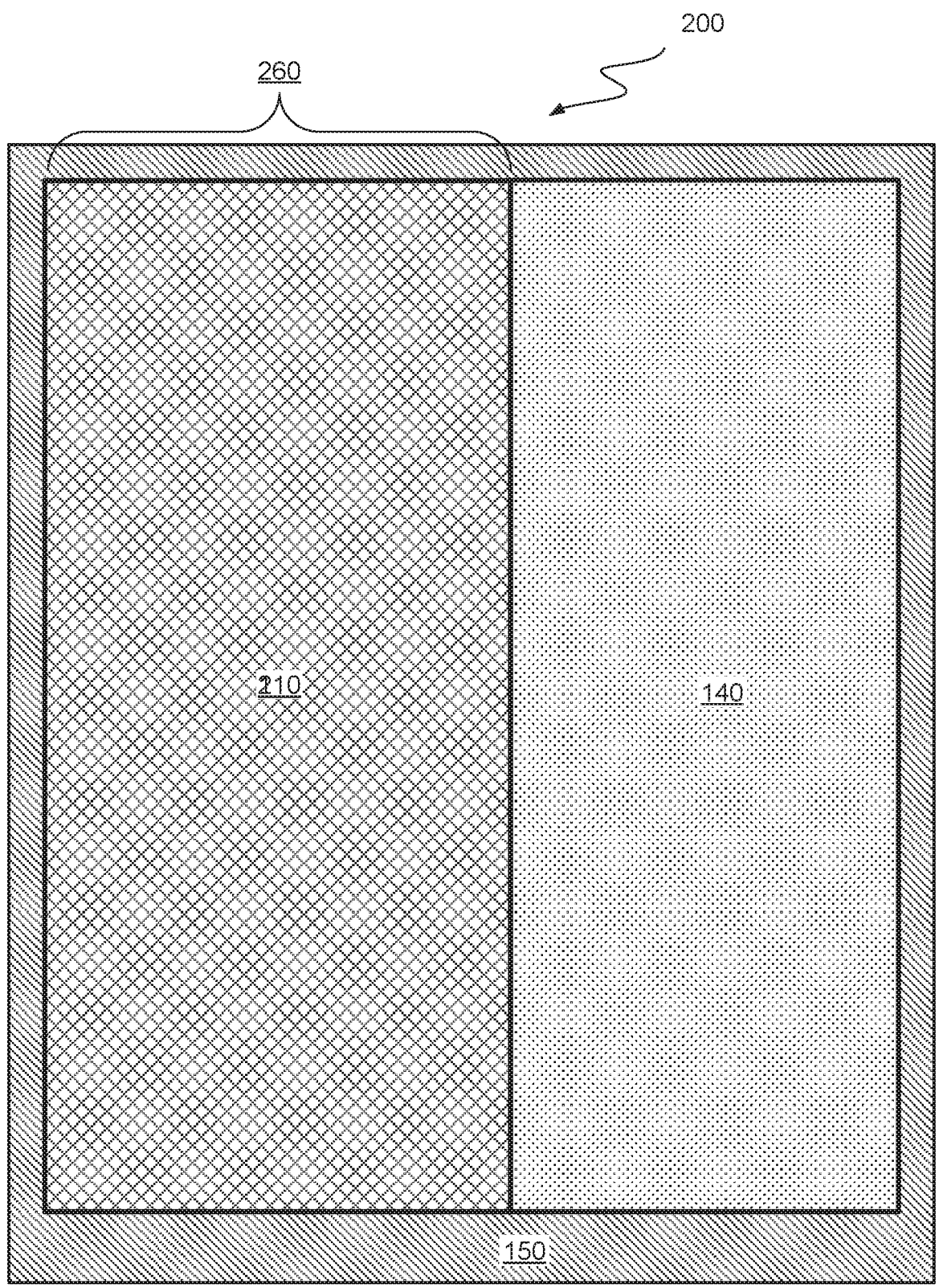
FIG. 2 is a side cut-away view illustrating a battery device with an integrated and activated cooling device, in accordance with an exemplary embodiment of the present invention.

FIG. 2 is a side cut-away view illustrating a battery device, 200, with an integrated and activated cooling device, in accordance with an exemplary embodiment of the present invention. In contrast to battery device 100 of FIG. 1, battery device 200 of FIG. 2 shows cooling device 210 that is active, i.e., cooling, and included in, i.e., integrated with, compartment 260. Note that cooling device 210 lacks barrier 120. In this embodiment, a temperature above the melting threshold of barrier 120 has resulted in disintegration of barrier 120, which resulted in the mixing of the chemicals that were respectively stored in chemical storage compartments 110 and 130. As such, chemical storage compartments 110 and 130 have been joined to form a contiguous compartment, i.e., compartment 260. In some embodiments, portions of barrier 120 may still exist in cooling device 210 but are not shown to illustrate the mixing of the chemicals that were included in chemical storage compartments 110 and 130.

Figure 3:
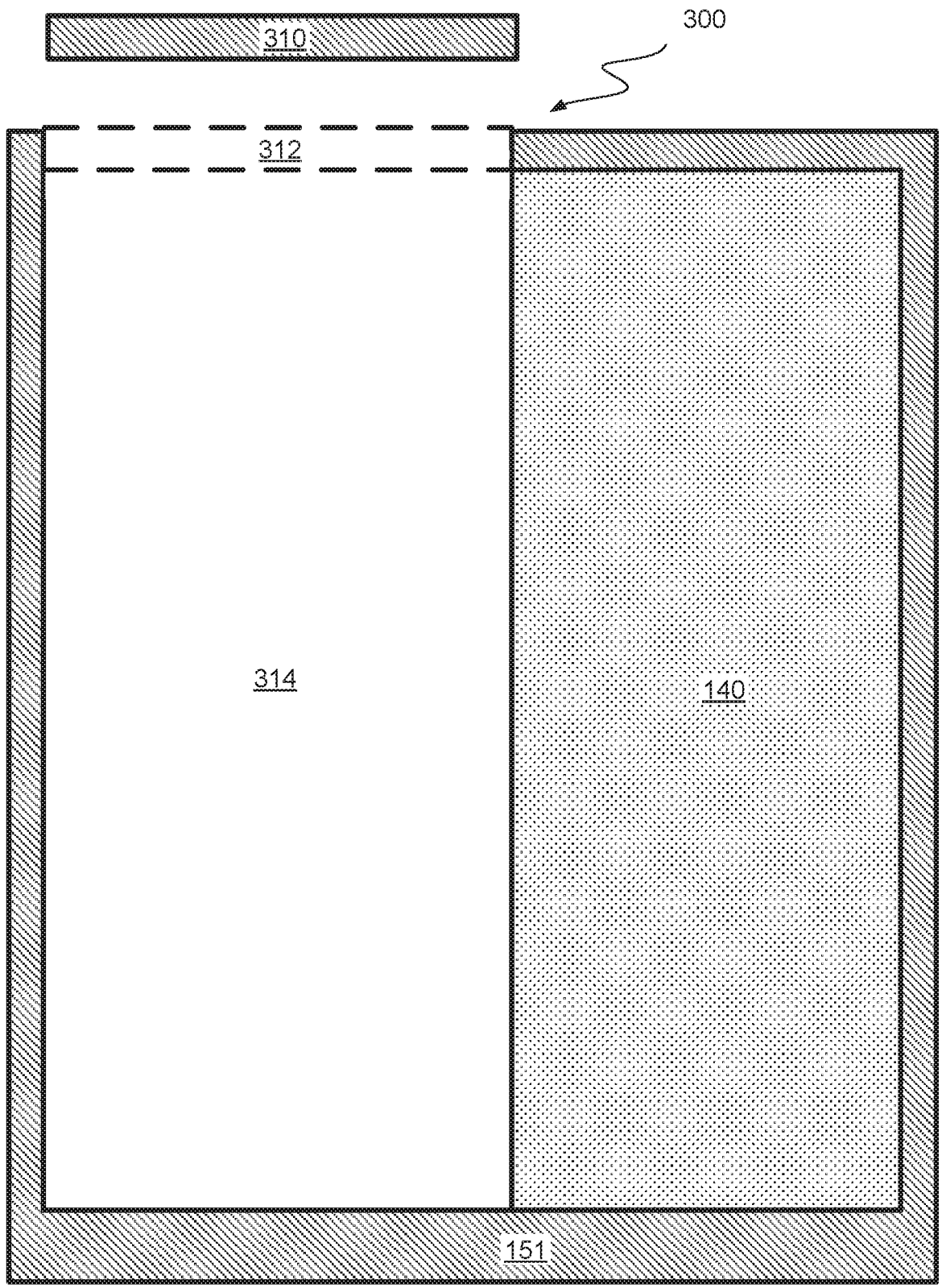
FIG. 3 is a side cut-away view illustrating a battery device with a compartment for a removable cooling device, in accordance with an exemplary embodiment of the present invention.

FIG. 3 is a side cut-away view illustrating a battery device, 300, with a compartment for a removable cooling device, in accordance with an exemplary embodiment of the present invention. In some embodiments, once a cooling device has been activated, the cooling device can be removed and replaced with a new un-activated cooling device. As shown in FIG. 3, enclosure material 151 (which is similar to enclosure material 150) includes removable portion, 310, which has been removed and an activated cooling device, similar to cooling device 210, has been removed, i.e., compartment 314 is empty. At this point, a new cooling device can be placed into compartment 314 and removable portion 310 secured into area 312 to yield a battery device that is similar to battery device 100. In some embodiments, enclosure material 151 includes locking devices that lock removable portion 310 into place, thereby retaining the containment aspects similar to those provided by enclosure material 150.

Figure 4:
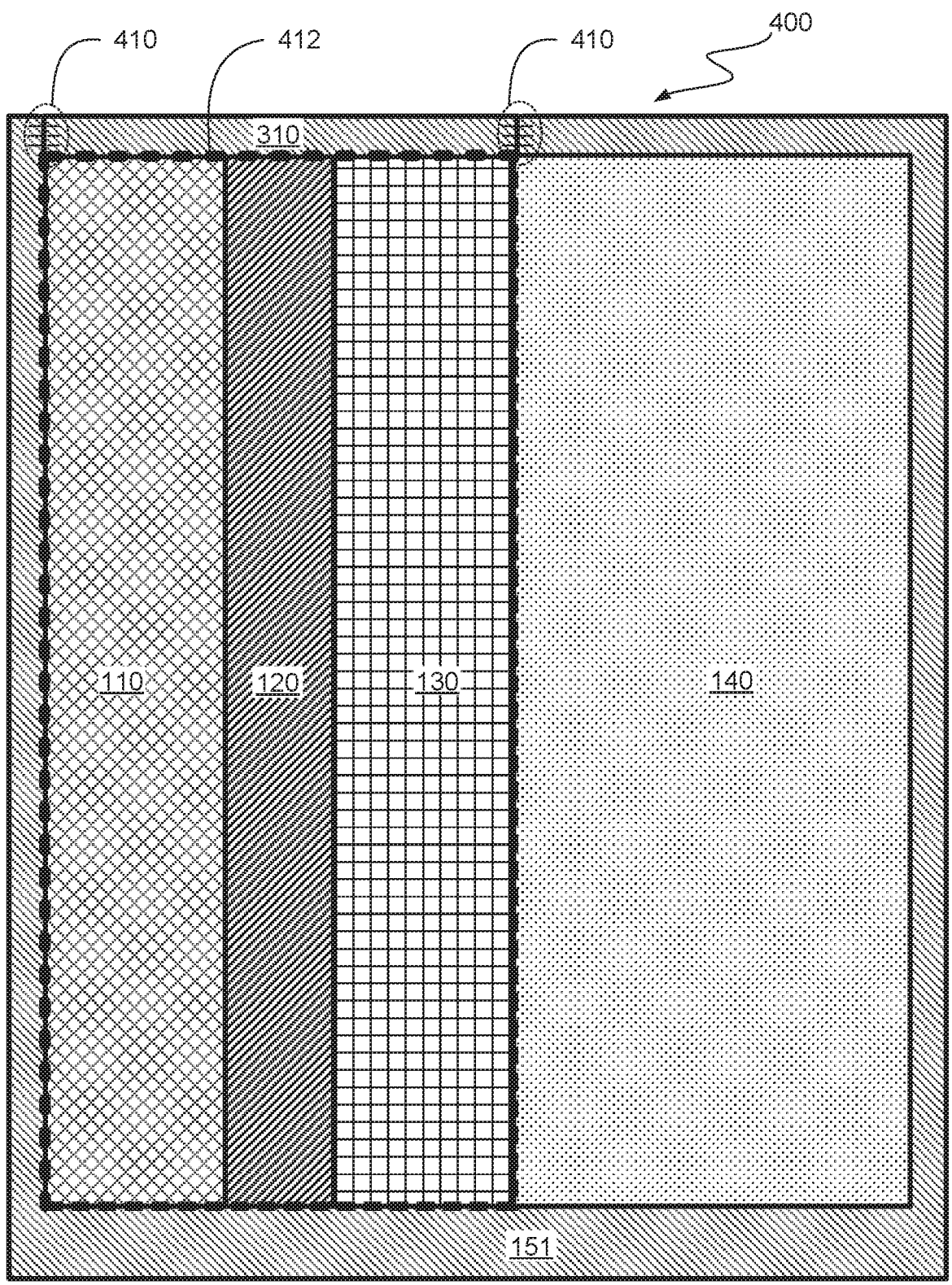
FIG. 4 is a side cut-away view illustrating a battery device with a compartment holding a removable cooling device, in accordance with an exemplary embodiment of the present invention.

FIG. 4 is a side cut-away view illustrating a battery device, 400, with a compartment holding a removable cooling device, in accordance with an exemplary embodiment of the present invention. In this embodiment, with reference to FIG. 4 and in continuation of the discussion of FIG. 3, (i) a new cooling device (comprising 110, 120, and 130 which are enclosed in a covering, denoted using dashed line 412) is shown inserted into compartment 314 and (ii) removable portion 310 has been secured into place using threaded locks, denoted using dashed ellipses 410. As such battery device 400 shares similarities with battery device 100 of FIG. 1. In this embodiment, the covering 412, and the components enclosed therein, are removable as a single component to provide ease of replacement. While not always shown in the Figures or noted in the description, one having skill in the art recognized that certain component may be combined together, or made separate, using various combinations of coverings, in accordance with a desired embodiment. Such modular designs are understood by those having ordinary skill in the art. In this embodiment, the threading of removable portion 310 fills the corresponding grooves that are cut into enclosure material 151, similar to, for example, a nut and bolt. While one specific example of a locking mechanism is provided herein one having skill in the art appreciates that there are numerous variations of locking devices that are within the scope of this disclosure.

Figure 5:
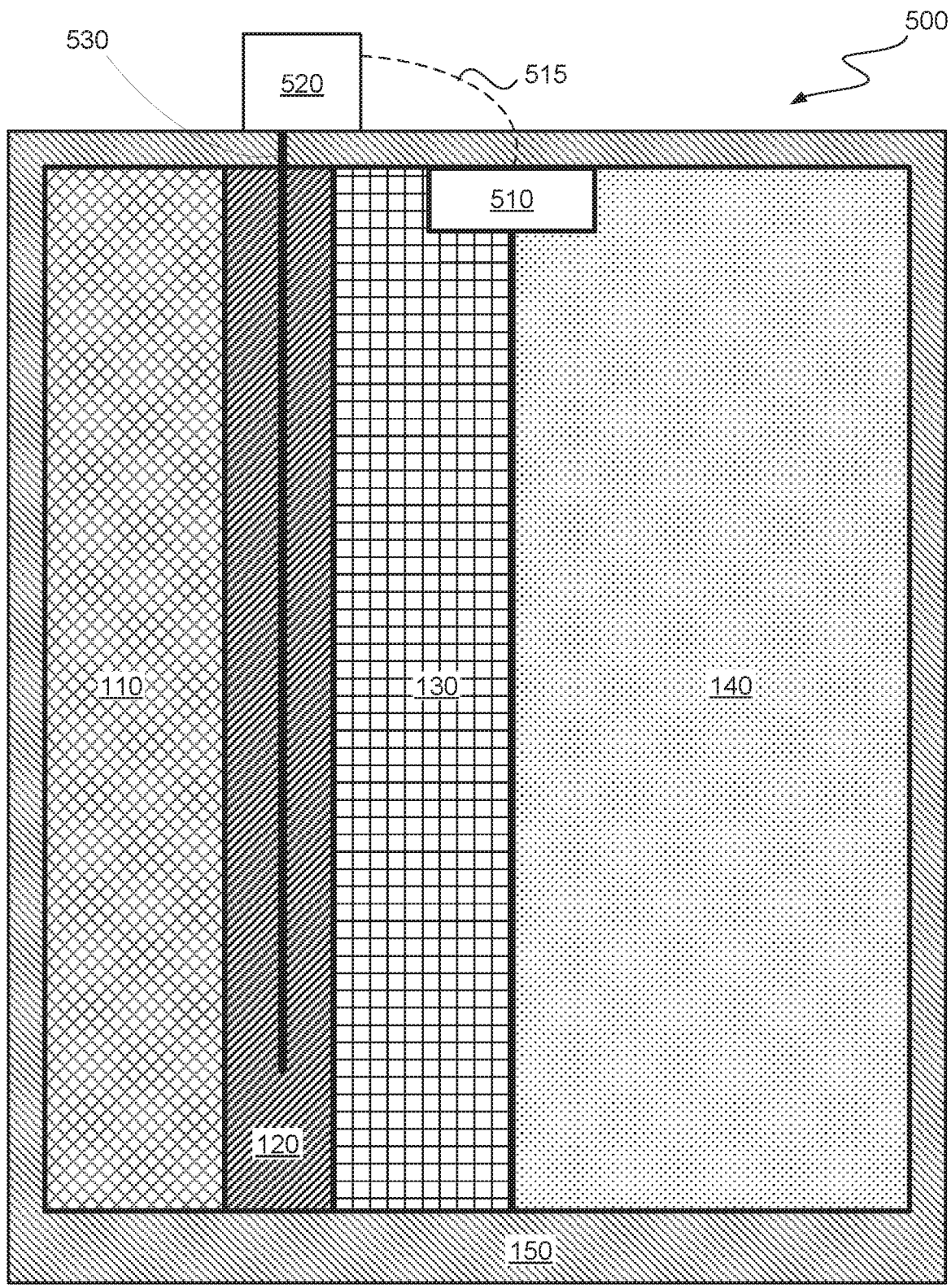
FIG. 5 is a side cut-away view illustrating a battery device with additional components for activating a cooling device, in accordance with an exemplary embodiment of the present invention.

FIG. 5 is a side cut-away view illustrating a battery device, 500, with additional components for activating a cooling device, in accordance with an exemplary embodiment of the present invention. As shown in FIG. 5, in one embodiment, battery device 500 includes control device 520, sensors 510, and heating element 530. In this embodiment, heating element 530 is embedded in barrier 120. In this embodiment, heating element 530, once activated by control device 520, produces heat that exceeds the melting point of barrier 120. As such, activation of heating element 530 results in the mixing of the chemicals that are respectively stored in chemical storage compartments 110 and 130. In this embodiment, control device 520, receives sensor data from sensors 510 and determines whether or not to activate heating element 530. In one embodiment, the sensor data is, at least in part, sent to and received by control device 520 wirelessly using connection 515. In other embodiments, connection 515 is a wired connection connecting sensors 510 to control device 520. In one embodiment, some of the logic and decision making functions of control device 520 are included in a computing device that is included as part of connection 515. For example, battery device 500 is a battery for a laptop computer and the logic and decision making functions of control device 520 are included as part of the laptop computer. In this example, control device 520 includes a small power source as part of battery device 500 that, once activated, provides power to heating element 530. In one embodiment, charge holding portion 140 provides power to heating element 530. In some scenarios and embodiments, such a configuration not only provides a ready and sufficient source of power to activate and power heating element 530, but the activation of heating element 530 serves to further reduce the charge held by charge holding portion 140. In one embodiments, control device 520 is a switching device that responds to signals from sensors 510 and includes a switch that (i) electrically disconnects charge holding portion 140 from a device it was powering and (ii) activates an electrical connection that provides power to heating element 530. For example, in response to a sensor signal that indicates the temperature of, and/or the rate of temperature increase of, battery device 500 is above a threshold, control device 520 disconnects an electrical connection to a device being powered by battery device 500 and creates and electrical connection to heating element 530.

In one embodiment, control device 520 includes logic to identify/differentiate between various scenarios that lead to increasing heat in battery device 500 based, at least in part, on sensor data from sensors 510. Some such scenarios include, but are not limited to, heat generated from (i) a high rate of power consumption by a device being powered by battery device 500; (ii) a level of resistance during charging of battery device 500; and (iii) an internal short circuit within battery device 500. For example, control device 520 receives data from sensors 510 that indicates battery device 500 is not (i) being used to power a device connected to battery device 500, or (ii) being charged. However, the sensor data indicates that the temperature in battery device 500 is rising and the stored charge is being reduced at rates that indicate eventual thermal run-away in battery device 500. As such, control device 520 sends power from a power source (included in control device 520) to heating element 530, which in turn results in the mixing of the chemicals that are respectively stored in chemical storage compartments 110 and 130. In general, control device 520 includes a set of rules that are followed by control device 520 to determine which actions to take based on a set of criteria being met. In this embodiment, control device 520 includes the ability to deactivate electrical connections to battery device 500 such that battery device 500 is deactivated, i.e., prevented from (i) being charged or (ii) used to power to power a device connected to battery device 500. In addition, in this embodiment, control device 520 sends an alert to notify one or both of a user and a computing device that battery device 500 has been deactivated.

In one embodiment, the alert includes one or more of (i) an audio alert, for example, a beeping tone; (ii) a visual alert, for example, a flashing light/indicator, (iii) an electronic message that may be processed by a computing device and/or displayed for a user. For example, control device 520 deactivates battery device 500. Since data from sensors 510 that indicates battery device 500 is not (i) being used to power a device connected to battery device 500, or (ii) being charged, control device 520 determines, based on the set of rules, that a short in battery device 500 is likely to have occurred and that activation of the cooling device in battery device 500 is insufficient to permanently prevent thermal run-away and/or fire from occurring. As such, control device 520 activates all available alert methods to warn of the impending danger. In this embodiment, in addition to activating one or more of (i) an audio alert, for example, a beeping tone; (ii) a visual alert, for example, a flashing light/indicator, (iii) an electronic message that may be processed by a computing device and/or displayed for a user, control device 520 also sends one or more of text messages, high priority emails, and/or initiates one or more phone calls to user(s) that are included in a list of emergency contacts. One having skill in the art appreciates that various rules and response combinations are within the scope of the invention and that the forgoing examples are not limiting the scope of the invention to just those examples.

Figure 6:
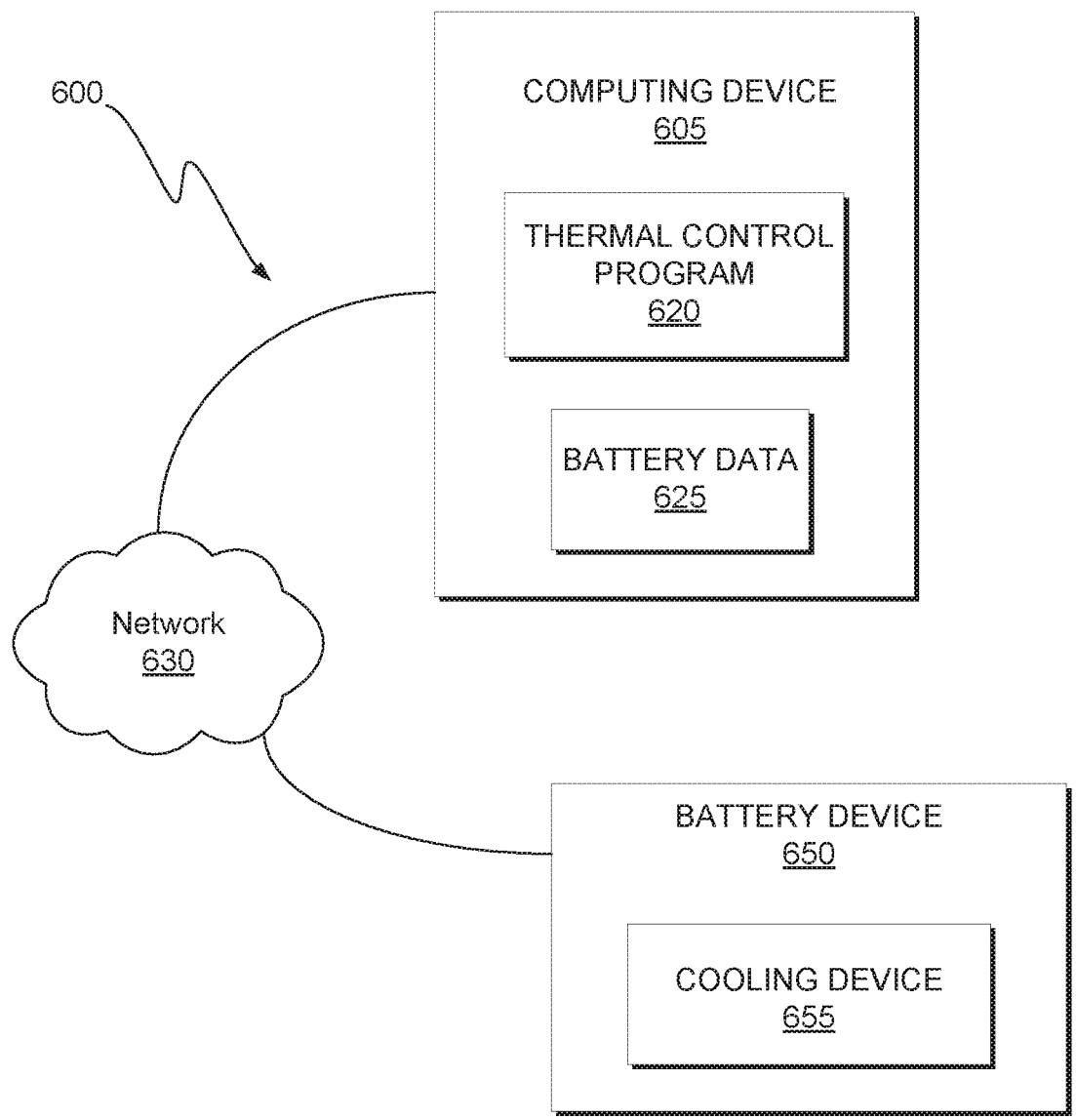
FIG. 6 is a functional block diagram illustrating a battery control environment, in accordance with an exemplary embodiment of the present invention.

FIG. 6 is a functional block diagram illustrating a battery control environment, generally designated 600, in accordance with one embodiment of the present invention. Battery control environment 600 includes thermal control program 620, battery data 625, computing device 605, cooling device 655, and battery device 650 connected over network 630. Computing device 605, includes thermal control program 620, battery data 625. Battery device 650 includes cooling device 655. In some embodiments, battery device 650 is included as part of computing device 605. In other embodiments, battery device 650 is located externally to, i.e., is not physically included as part of, computing device 605. In such embodiments, computing device communicates with/is connected to battery device 650 and provides battery control services to battery device 650, in accordance with one embodiment of the present invention. An example of such battery control service is provided hereinafter, with reference to FIG. 7 and its associated description.

In various embodiments of the present invention, computing device 605 is a computing device that can be a standalone device, a server, a laptop computer, a tablet computer, a netbook computer, a personal computer (PC), or a desktop computer. In another embodiment, computing device 605 represents a computing system utilizing clustered computers and components to act as a single pool of seamless resources. In general, computing device 605 can be any computing device or a combination of devices with access to thermal control program 620, battery data 625 and is capable of executing thermal control program 620. Computing device 605 may include internal and external hardware components, as depicted and described in further detail with respect to FIG. 8.

In this exemplary embodiment, thermal control program 620 and battery data 625 are stored on computing device 605. However, in other embodiments, thermal control program 620 and battery data 625 may be stored externally and accessed through a communication network, such as network 630. Network 630 can be, for example, a local area network (LAN), a wide area network (WAN) such as the Internet, or a combination of the two, and may include wired, wireless, fiber optic or any other connection known in the art. In general, network 630 can be any combination of connections and protocols that will support communications between thermal control program 620, battery data 625, computing device 605, and battery device 650, in accordance with a desired embodiment of the present invention.

In exemplary embodiments, battery device 650 is a battery that includes cooling device 655. Cooling device 655 functions in a manner following the description of the cooling devices described with reference to FIGS. 1-5, 9, 10, 11A-11C, and 12A-12B.

In exemplary embodiments, battery data 625 includes data regarding at least battery device 650. In some embodiments, battery data 625 includes profiles and data regarding a plurality of batteries, of a type, that includes battery device 650. For example, battery data 625 includes a thermal profile (expected changes in the temperature) for charging and discharging of a specific type of lithium-ion battery ("Type A"). Since battery data 625 is of Type A, data received regarding battery device 650 is associated with and interpreted, in part, according to/in comparison with, what is expected for a battery of type A.

In exemplary embodiments, thermal control program 620 is a computer program that actively monitors data about battery device 650 (i.e., monitors battery data 625) and controls, at least in part the activation/activity of cooling device 655. For example, battery device 650 is charging (based on data received regarding battery device 650) and the temperature of battery device 650 is fifteen percent what is expected for battery device 650, based on a charging profile associated with battery device 650. In response, thermal control program 620 determines that battery device 650 is exhibiting abnormal behavior, i.e., a temperature above a threshold, and triggers the activation of cooling device 655.

In one embodiment, battery device 650 includes one or more sensors to determine performance characteristics that may include, but are not limited to, temperature, output voltage, output current, and resistance of battery device 650. In this embodiment, battery device sends the sensor data to computing device 605 and the sensor data is stored as part of battery data 625. In one embodiment, battery device 650 has three states that battery device 650 can be in and each state has a profile associated with it. The states include a state of discharging, a state of charging, and a state of standby (not actively charging or discharging) in which power is not actively being drawn to power a device, although the stored charge may slowly decline due to a self-discharge process in battery device 650.

Figure 7:
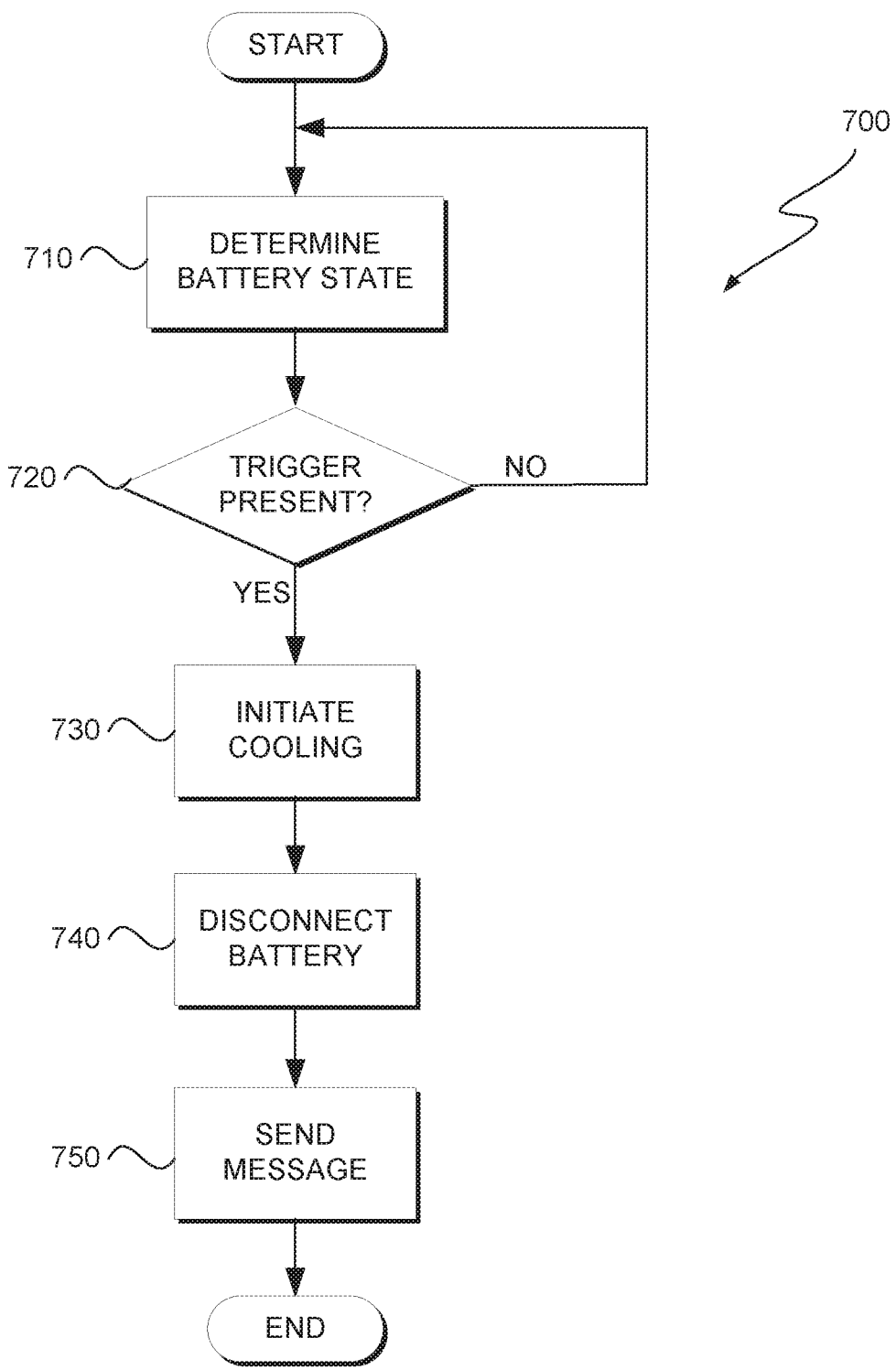
FIG. 7 illustrates operational processes of a thermal control program, executing on a computing device within the environment of FIG. 6, in accordance with an exemplary embodiment of the present invention.

FIG. 7 illustrates operational processes of a thermal control program, 620, executing on a computing device within the environment of FIG. 6, in accordance with an exemplary embodiment of the present invention.

In process 710, thermal control program 620 determines the status of battery device 650 by accessing the data included in battery data 625 and determining a state of battery device 650 based, at least in part, on that data, i.e., thermal control program 620 monitors (collects sensor data regarding) battery device 650 and determines its state accordingly. For example, based on the current flowing from battery device 650, thermal control program 620 determines that battery device 650 is in a state of discharge, i.e., the stored energy included in battery device 650 is being consumed by a device that is connected to/is being powered by battery device 650. In another example, thermal control program 620 matches the electrical characteristics of battery device 650 to a profile and determines that battery device 650 is being charged. In one embodiment, thermal control program 620 periodically determines the state of battery device 650 and stores that information as part of battery data 625. In one embodiment, the stored data regarding the state of battery device 650 is leveraged for further analysis/ determinations in other instances of process 710 and/or in decision process 720. Embodiments of the present invention recognize that, in certain scenarios, iterative analysis/determinations of the state of battery device 650 indicate that battery device 650 is exhibiting a pattern of behavior that is indicative of, will likely cause/lead to, a condition of thermal-runaway or fire.

In decision process 720, thermal control program 620 determines if a trigger is present. In one embodiment, thermal control program 620 determines that a trigger is present if one or more conditions are met that indicate an abnormal operation of battery device 650. Such conditions may be determined based one or more of known patterns/ characteristics that is indicative of, will likely cause/lead to, a condition of thermal-runaway or fire. For example, thermal control program 620 accesses a profile for battery device 650, which is included in battery data 625. The profile indicates a rate of heat generation during normal use of battery device 650, i.e., during a period of discharge to power as device connected to battery device 650. However, a determined rate of heat generation for battery device 650 is fifty percent above the expected rate, i.e., is 150% the expected/acceptable rate of heat generation. In response to the determined rate of heat generation being above a threshold of ten percent variance (i.e., the determined rate of heat generation is greater than 110% of the acceptable rate of heat generation), thermal control program 620 determines that a trigger is present. If thermal control program 620 determines that a trigger is not present (decision process 720, NO branch), then thermal control program 620 returns to process 710 and continues to determine/monitor the state of battery device 650. If thermal control program 620 determines that a trigger is present (decision process 720, YES branch), then thermal control program 620 proceeds to process 730.

In process 730, thermal control program 620 initiates cooling of battery device 650 by activating cooling device 655.

In process 740, thermal control program 620 disconnects battery device 650. In other words, thermal control program 620 removes one or more electrical connections that enable battery device 650 to supply power to a device connected to/is powered by battery device 650. For example, battery device 650 is included in a bank of batteries that provide emergency power for a power plant facility. Thermal control program 620 activates a switch that electrically disconnects battery device 650 from the rest of the bank of batteries. As such, battery device 650 can neither be charged nor used to provide power.

In process 750, thermal control program 620 sends out one or more messages indicating that cooling device 655 has been activated and that battery device 650 exhibited a type of behavior. In one embodiment, the type of behavior indicates a probable type of malfunction in battery device 650 that resulted in the type of behavior. For example, the trigger determined in decision process 720 indicates that an internal short is likely. As such, the message indicates that battery device 650 has experienced an internal short and been disabled (disconnected). In some embodiments, based on the probable type of malfunction, the message includes additional instructions. For example, activating cooling device 655 provides a time period during which battery device 650 can be safely removed, i.e., thermal runaway and/or fire is unlikely to occur due to the cooling of battery device 650. As such, the message includes instructions and a time frame during which battery device 650 should be removed, which prevents the spread of thermal run-away to other battery devices included in a bank of batteries. In this scenario, thermal run-away and/or fire can only be prevented for a time period based on the cooling, and duration thereof, provided by cooling device 655. Determinations of how long a given endothermic reaction can cool an object (that is generating heat at a given rate) are well understood by those having skill in the art. Further understood, is how long it will take for an object that is generating heat to reach a temperature. As such, predictions of how long it is likely to take for a thermal run-away event to commence is clearly disclosed herein and is well understood by those having skill in the art. In other scenarios, thermal run-away and/or fire is preventable indefinitely by removing the source of the heat generation, e.g., disconnecting battery device 650 that is overheating due to a high rate of discharge/power drain by a device being powered by battery device 650.

Figure 8:
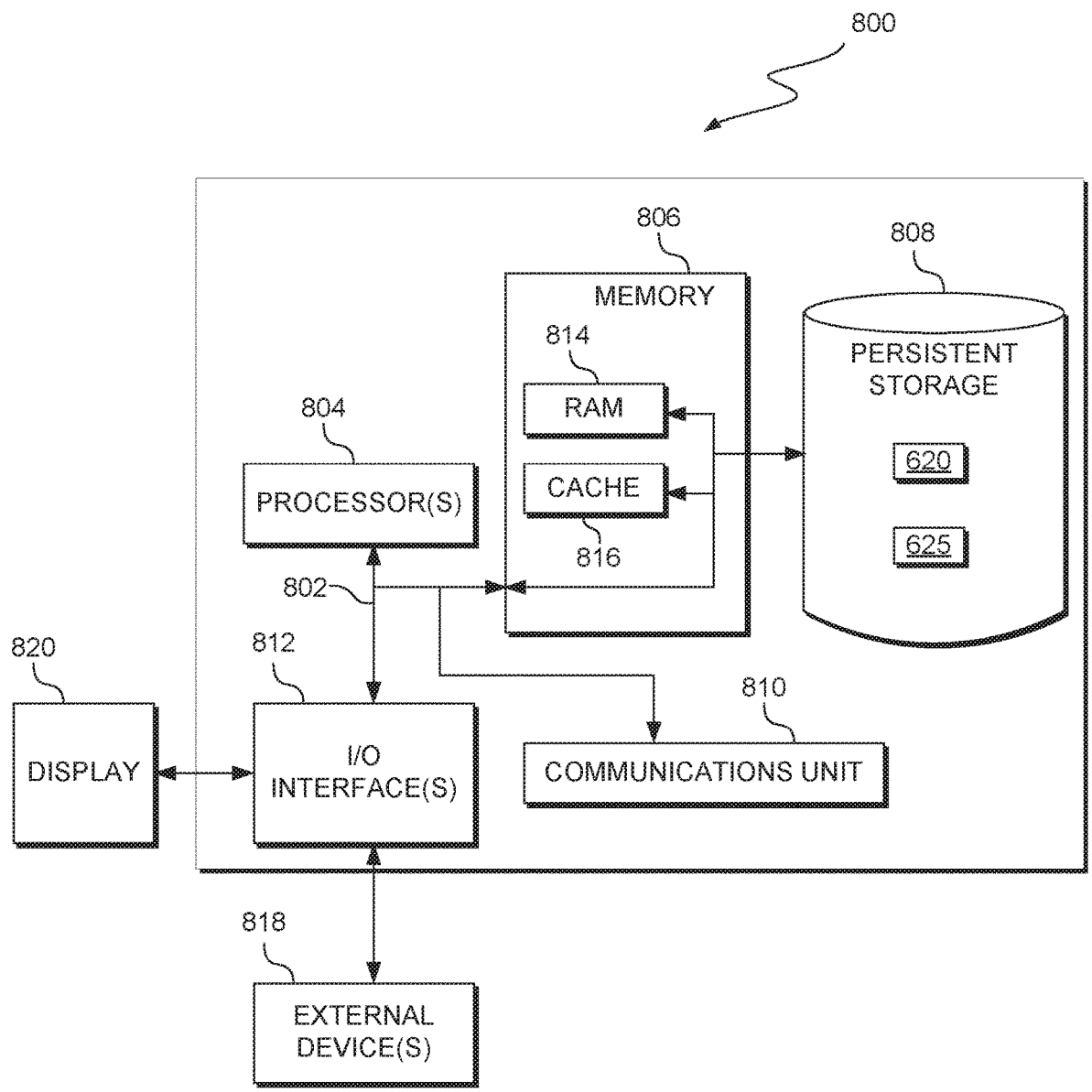
FIG. 8 depicts a block diagram of components of the computing device executing a thermal control program, in accordance with an exemplary embodiment of the present invention.

FIG. 8 depicts a block diagram of components of the computing device executing thermal control program 620, in accordance with an exemplary embodiment of the present invention.

FIG. 8 depicts a block diagram, 800, of components of computing device 605, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

As shown in FIG. 8, computing device 605 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Thermal control program 620 and battery data 625 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 630. In these examples, communications unit 810 includes one or more network interface cards. Communications unit 810 may provide communications through the use of either or both physical and wireless communications links. Thermal control program 620 and battery data 625 may be downloaded to persistent storage 808 through communications unit 810.

I/O interface(s) 812 allows for input and output of data with other devices that may be connected to computing device 605. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., thermal control program 620 and battery data 625, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be one or more of (i) a cooling device and battery device combination that performs a method, (ii) a computer program product that utilizes a cooling device and battery combination, and (iii) a computer system that utilizes a cooling device and battery combination. The computer program product may include a computer readable storage medium (or media) having computer readable program instructions thereon for causing a processor to carry out aspects of the present invention.

Some embodiments of the present invention recognize that certain power consuming devices/systems utilize multiple battery sources in tandem and/or in parallel. As such, a variety of combinations/organizations of battery devices and cooling devices are within the scope of the present invention.

Figure 9:
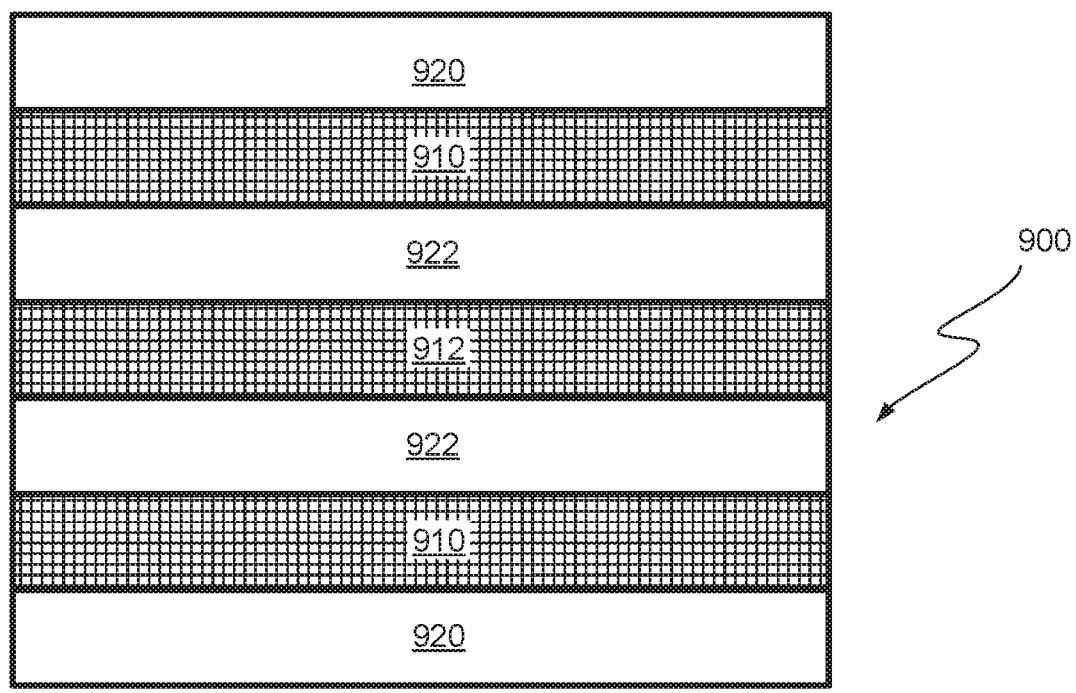
FIG. 9 is a side cut-away view illustrating a stack of alternating battery devices and cooling devices, in accordance with an exemplary embodiment of the present invention.

FIG. 9 is a side cut-away view illustrating a stack of alternating battery devices, 910 and 912, and cooling devices, 920 and 922, in accordance with an exemplary embodiment of the present invention. In this embodiment and example, battery device 912 is exhibiting characteristics that are indicative of imminent thermal run-away/fire, e.g., is malfunctioning. In this embodiment and example, a malfunction in battery device 912 activates abutting cooling devices 922. As such, malfunctioning battery device 912 is cooled by two different cooling devices. Embodiments of the present invention recognize that activating multiple cooling devices provides an amount of redundancy and insurance that a given malfunctioning battery device will be cooled and that thermal run-away/fire is prevented, at least temporarily.

Figure 10:
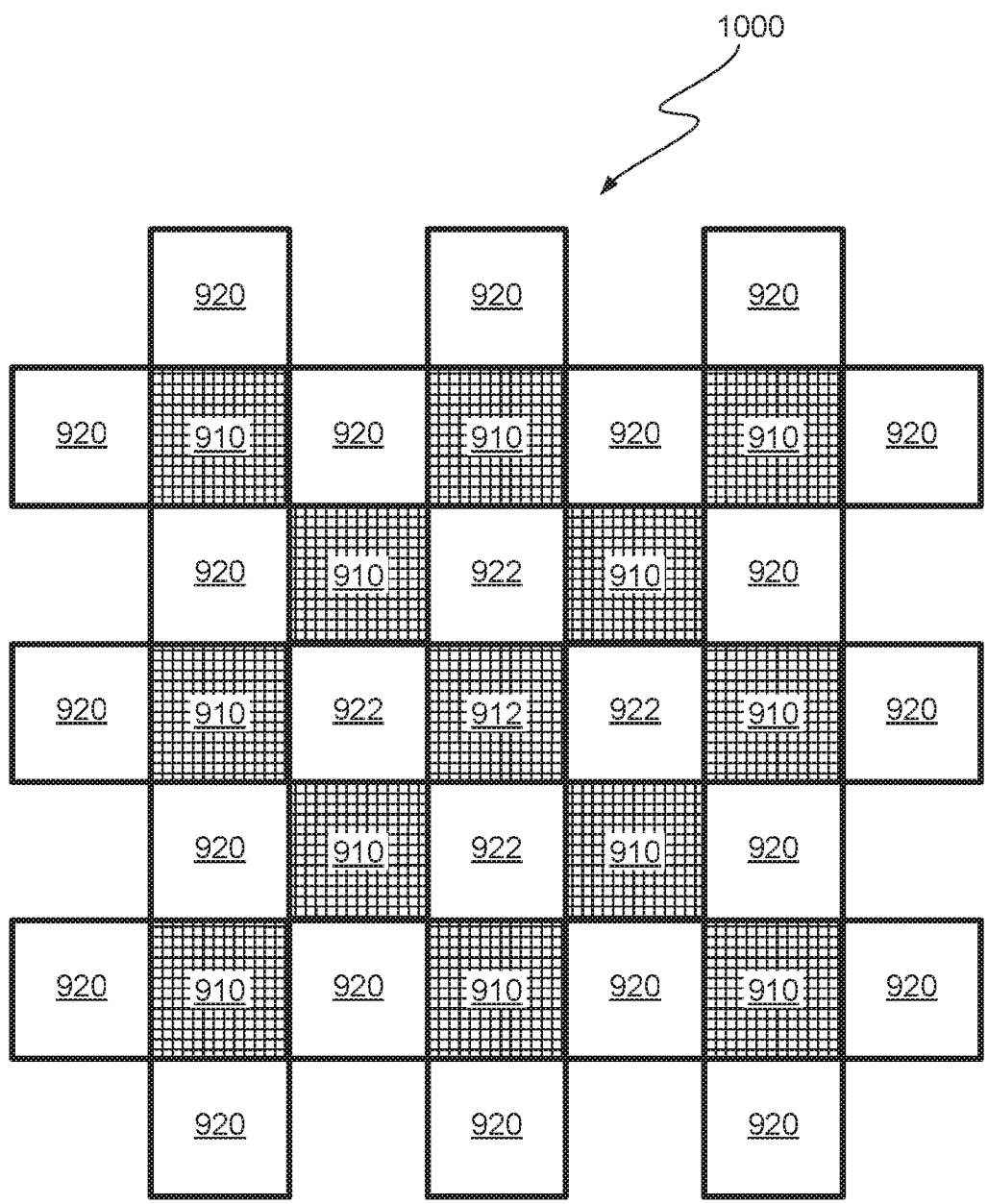
FIG. 10 is a top-down view illustrating a pattern of alternating battery devices and cooling devices, in accordance with an exemplary embodiment of the present invention.

FIG. 10 is a top-down view illustrating a pattern of alternating battery devices and cooling devices, in accordance with an exemplary embodiment of the present invention. Similar to the stack described in FIG. 9, FIG. 10 includes a pattern of alternating battery devices, 910 and 912, and cooling devices, 920 and 922, in accordance with an exemplary embodiment of the present invention. In this embodiment and example, battery device 912 is exhibiting characteristics that are indicative of imminent thermal run-away/fire, e.g., is malfunctioning. In this embodiment and example, a malfunction in battery device 912 activates abutting cooling devices 922. As such, malfunctioning battery device 912 is cooled by four different cooling devices. Embodiments of the present invention recognize that such a pattern of alternating battery devices and cooling devices, and their activation, provides an amount of redundancy and insurance that a given malfunctioning battery device will be cooled and that thermal run-away/fire is prevented, at least temporarily. In one embodiment, such a configuration is used to create a power storage device utilized by, for example, and is not limited to, a municipal power system, a data center, a hospital, a law enforcement building, a fire response facility, and an electric vehicle.

Figure 11A:
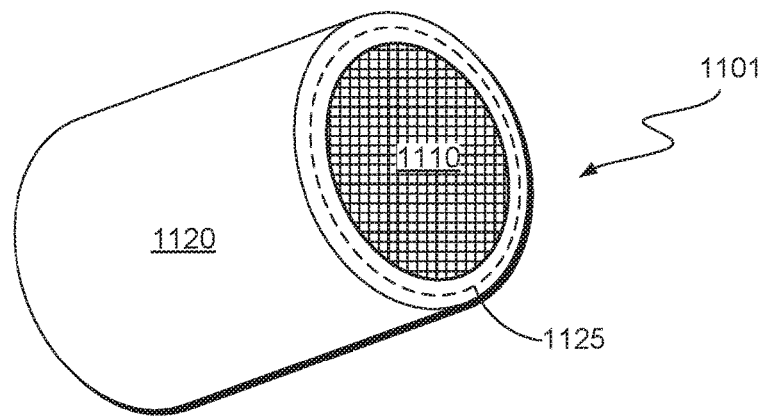
FIG. 11A-11C show views of a cylindrical shaped removable cooling device that jackets a battery device, in accordance with an exemplary embodiment of the present invention.
Figure 11B:
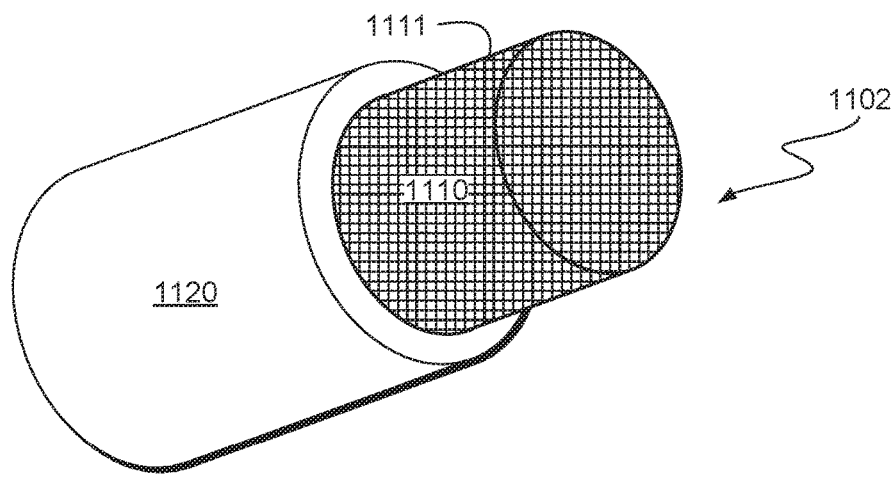
Figure 11C:
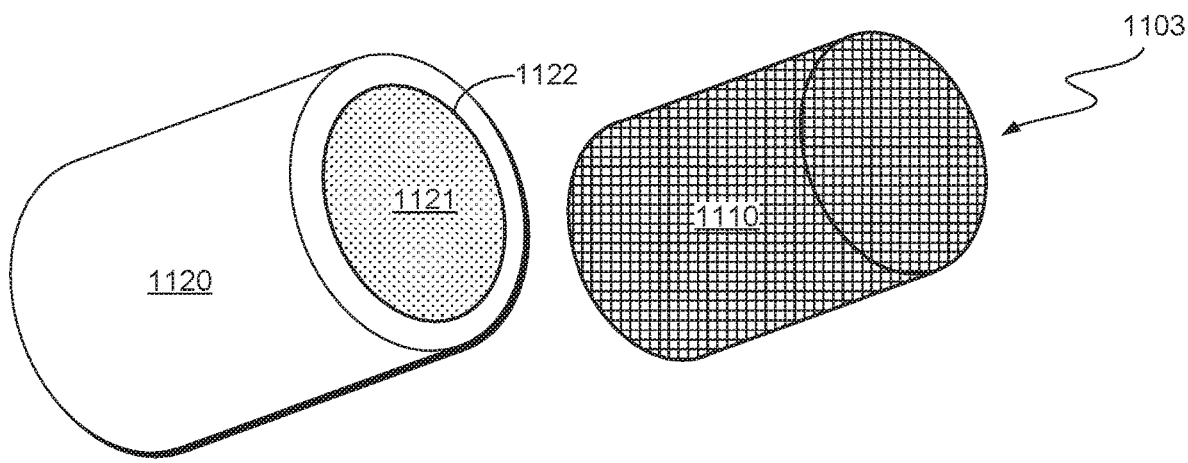

FIG. 11A-11C show views of a cylindrical shaped removable cooling device that jackets a battery device, in accordance with an exemplary embodiment of the present invention. In FIG. 11A, a battery device 1110 is shown and is jacketed by cooling device 1120. In this example embodiment, a barrier (indicated by dashed line 1125) separates cooling device 1120 into chemical storage compartments that hold endothermic reactants. This embodiment recognizes that certain combinations of shapes for battery devices and cooling devices provide more surface area than others, which can be leveraged to provide enhanced rates of cooling. In the present example embodiment, the nesting cylindrical shapes of cooling device 1120 and battery device 1110 respectively provide surfaces 1122 and 1111, that abut and align in FIG. 11A, along the respective lengths of their cylinders, which yields an increased the rate of cooling when aligned as in FIG. 11A and cooling device 1120 is active.

In the embodiment of FIGS. 11A-11C, cooling device 1120 is separate from, i.e., not enclosed as part of battery device 1110. In the illustrated embodiment, cooling device 1120 includes a cavity, 1121, into which battery device 1110 is placed. As such, in FIG. 11A, in configuration 1101, battery device 1110 is fills cavity 1121 of cooling device 1120. In FIG. 11B, in configuration 1102, battery device 1110 is shown as mostly removed from cavity 1121. In FIG. 11C, in configuration 1103, battery device 1110 is completely removed from cavity 1121 of cooling device 1120. As such, the embodiment illustrated in FIGS. 11A-11C provides an alternative for a removable/replaceable cooling device for a given battery device. Note that the embodiment of FIGS. 11A-11C may include some or all of the features of other embodiments as described herein.

Figure 12A:
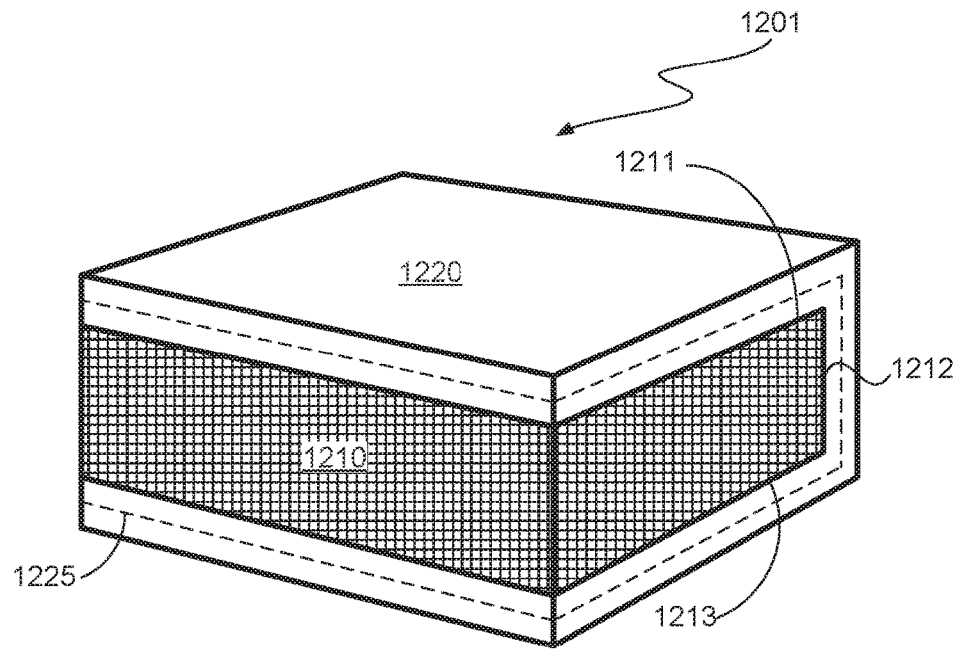
FIG. 12A-12B show views of a removable cooling device jacket with a channel for a battery device, in accordance with an exemplary embodiment of the present invention.
Figure 12B:
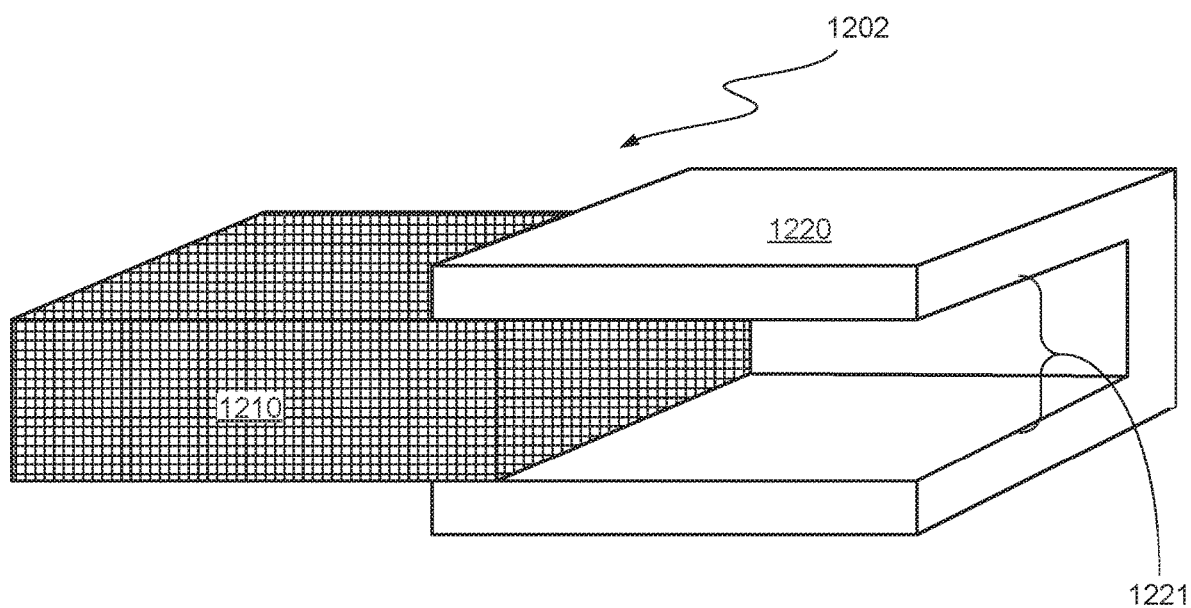

FIG. 12A-12B show views of a removable cooling device jacket with a channel for a battery device, in accordance with an exemplary embodiment of the present invention. The embodiment shown in FIGS. 12A and 12B is similar, in some respects, to the embodiment of FIGS. 11A-11C. In contrast to the embodiment of FIGS. 11A-11C, the embodiment of FIG. 12A-12B show views of a "U" shaped removable cooling device that jackets a battery device, in accordance with an exemplary embodiment of the present invention. In FIG. 12A, a battery device 1210 is shown and is jacketed by cooling device 1220. In this example embodiment, a barrier (indicated by dashed line 1225) separates cooling device 1220 into chemical storage compartments that hold endothermic reactants.

Similar to the embodiment of FIGS. 11A-11C, this embodiment recognizes that certain combinations of shapes for battery devices and cooling devices provide more surface area than others, which can be leveraged to provide enhanced rates of cooling and/or increased storage efficiency. In the present example embodiment, the nesting rectangular shapes of cooling device 1220 and battery device 1210 provide a total surface area of a multiple abutting surfaces of cooling device 1220 and battery device 1210 that, when aligned, yield an increased the rate of cooling. In this embodiment, as numbered in FIG. 12A, one having skill in the art sees that a back surface, 1212, a top surface, 1211, and a bottom surface, 1213, of battery device 1210 abut corresponding interior surface of cooling device 1220. In the embodiment of FIGS. 12A-12B, cooling device 1220 is separate from, i.e., not enclosed as part of battery device 1210. In the illustrated embodiment, cooling device 1220 includes a channel, indicated by bracket 1221 in FIG. 12B, into which battery device 1210 is placed. As such, in FIG. 12A, in configuration 1201, battery device 1210 fills the channel of cooling device 1220. In FIG. 12B, in configuration 1202, battery device 1210 is shown as mostly removed from the channel of cooling device 1220. Similar to the embodiment of FIG. 11C, battery device 1210 is completely removable from the channel of cooling device 1220. As such, the embodiment illustrated in FIGS. 12A-12B provides an alternative for a removable/replaceable cooling device for a given battery device. Note that the embodiment of FIGS. 12A-12B may include some or all of the features of other embodiments as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. Device for preventing thermal run-away in batteries, the device comprising:
   a plurality of endothermic chemical reaction devices arranged in an alternating pattern with a plurality of power storage devices, wherein each of the plurality of endothermic chemical reaction devices includes:
     a main compartment that is divided into a plurality of sub-compartments including at least a first compartment and a second compartment;
     a layer of material that separates (i) the first compartment, which contains a first chemical and (ii) the second compartment, which contains a second chemical; and
     a first covering that (i) encloses the main compartment and (ii) has a melting point above 60° C.

2. The device of claim 1, wherein the first chemical and second chemical, when combined, produce a first endothermic process by one or both of chemical reaction and dissolution.

3. The device of claim 2, the device further comprising:
   a third compartment that includes one or more chemicals that produce a second endothermic process using a product of the first endothermic process.

4. The device of claim 1, the device further comprising:
   a heating element that is integrated into or is adjacent to the layer of material.

5. The device of claim 4, the device further comprising:
   one or more circuits connected to a second sensor that, in part, monitors the temperature of a second power storage device and activates the heating element in the event a temperature of the second power storage device at least meets a threshold temperature.

6. The device of claim 1, the device further comprising:
   a first sensor that, in part, monitors the temperature of the device.

7. The device of claim 1, the device further comprising:
   a first power storage device that abuts at least a portion of the main compartment.

8. The device of claim 7, wherein a covering of the main compartment encompasses at least a part of an outer surface of the first power storage device.

9. The device of claim 7, wherein the first covering, the first compartment, the second compartment, and the layer of material comprise a cooling jacket with an internal surface that wraps around and abuts, at least a portion of, an exterior surface of the first power storage device.

10. The device of claim 7, the device further comprising:
    a plurality of main compartments that surround and abut the first power storage device.

11. The device of claim 7, the device further comprising:
    a plurality of main compartments that (i) surround, at least in part, and (ii) abut, at least in part, a plurality of power storage devices.

12. The device of claim 7, the device further comprising:
    one or more switches that electrically disconnect the first power storage device from a device that is powered by the first power storage device.

13. The device of claim 1, the device further comprising:
    one or more light components that emit or reflect specific colors of light to indicate a temperature of, at least a portion of, the main compartment.

14. The device of claim 13, wherein the one or more light components include one or more of chemiluminescent microcapsules, a leucodye, and a thermochromic material.

15. The device of claim 1, the device further comprising:
    a second covering that at least partially encloses at least one removable container that fits into at least one sub-compartment of the plurality of sub-compartments; and an opening in the first covering, the opening having a size and shape that allows removal of the at least one removable container from the main compartment.

16. The device of claim 1, the device further comprising:
at least one component that emits one or more of an audio tone, a visual indication, a scent, and an electronic message in response to a determination that a temperature of, at least a portion of, the main compartment at least meets a threshold.

17. A device for preventing thermal run-away in batteries, the device comprising:
a plurality of endothermic chemical reaction devices arranged in an alternating pattern with a plurality of power storage devices, wherein each of the plurality of endothermic chemical reaction devices includes a layer of material that separates (i) a first compartment, which contains a first chemical and (ii) a second compartment, which contains a second chemical;
one or more computer processors;
one or more computer readable storage medium;
program instructions stored on the computer readable storage medium for execution by at least one of the one or more processors, the program instructions comprising:
program instructions to determine a temperature of the power storage device; and
program instructions to activate the endothermic device in response to a determination that the temperature of the power storage device exceeds a threshold that indicates a potential thermal run-away event for the power storage device.

18. The device of claim 17, the device further comprising:
one or more switches incorporated into an electrical circuit between the power storage device and one or both of (i) a charging device that charges the power storage device and (ii) a power consuming device that draws stored power from the power storage device; and
program instructions to activate the one or more switches to electrically disconnect the first power storage device from one or both of (i) a charging device and (ii) the power consuming device in response to the determination that the temperature of the power storage device exceeds the threshold.

19. The device of claim 17, the device further comprising:
program instructions to send an electronic message to a computing device in response to the determination that the temperature of the power storage device exceeds the threshold.

20. The device of claim 17, the device further comprising:
program instructions to determine an amount of delay before the potential thermal run-away event is predicted to become an actual thermal run-away event; and
program instructions to communicate the amount of delay to a user associated with the power storage device.

* * * * *